Oct. 3, 1944.　　　　　E. T. ALLEN　　　　　2,359,599
CONVERTIBLE INFANT CARRIER
Filed Oct. 16, 1943
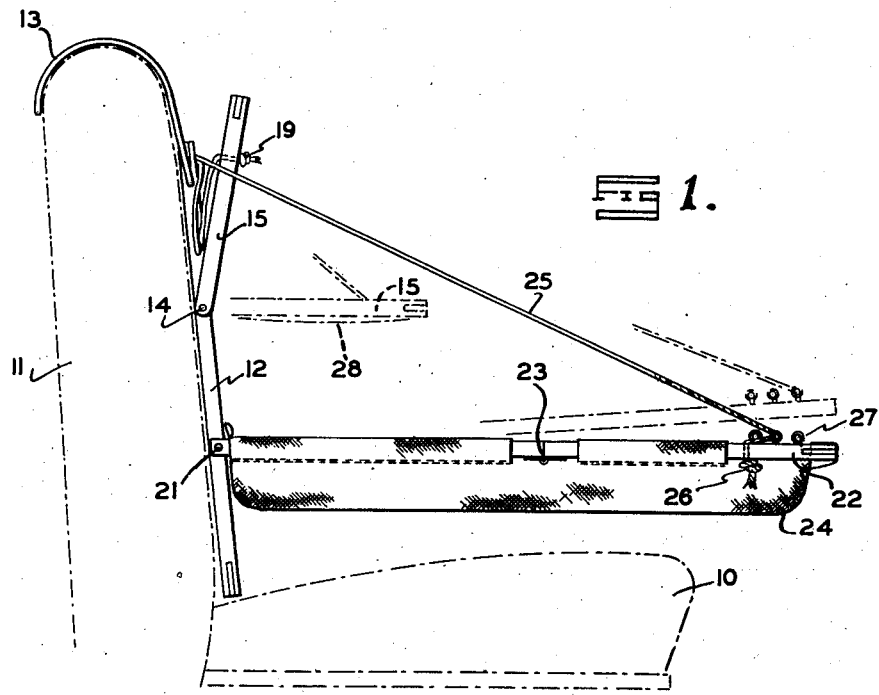
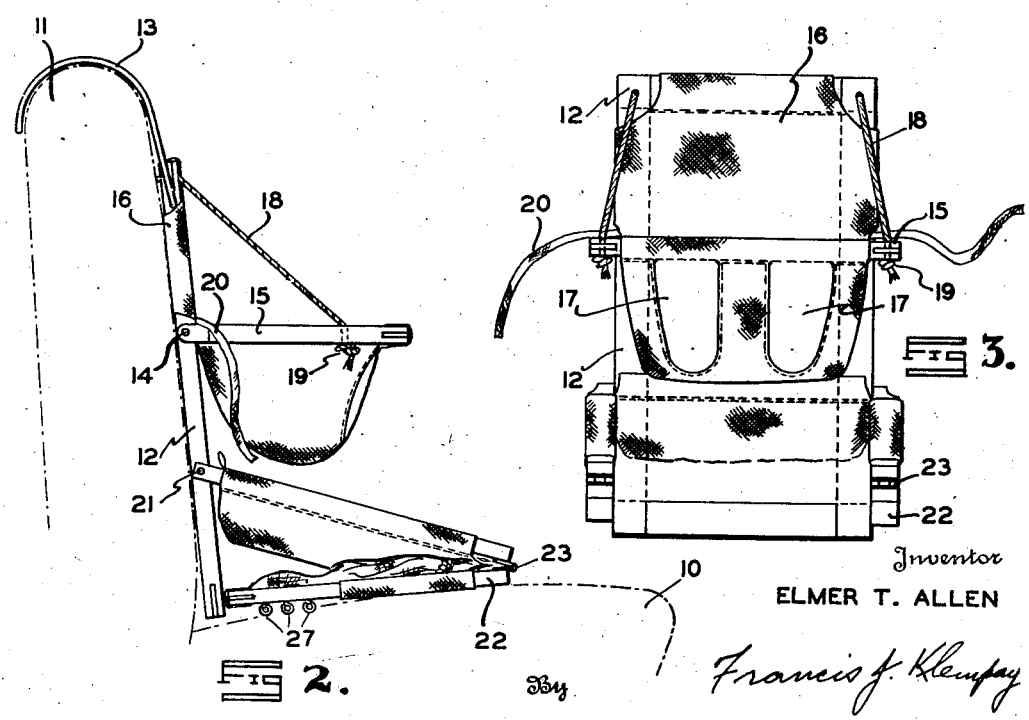
Inventor
ELMER T. ALLEN Patented Oct. 3, 1944

2,359,599

UNITED STATES PATENT OFFICE 2,359,599

CONVERTIBLE INFANT CARRIER

Elmer T. Allen, Youngstown, Ohio

Application October 16, 1943, Serial No. 506,544

3 Claims. (Cl. 155—79)

This invention relates to a convertible infant carrier and more particularly to such device which is especially adaptable for use in a motor passenger vehicle in connection with the passenger seats normally employed in such vehicles. More particularly, the carrier of the invention is adapted to be secured to and carried by a seat of the vehicle and to be alternatively used as a chair or seat or as a crib or cot for carrying an infant in a safe manner in the vehicle.

The primary object of the invention is the provision of an assembly for the purposes stated which is simple in design, economical to construct, and which possesses certain advantages in use which will be described in detail hereinafter. Another object of the invention is the provision of an improved assembly for the purposes stated which may be readily folded for shipment and storage but which is, nevertheless, readily available in properly assembled condition for attachment to the seat of the vehicle and for immediate use thereof.

A more specific object of the invention is the provision of an assembled infant carried especially adaptable for motor vehicle use which may be readily and alternatively used either as a chair or cot and when used for the former purpose elements of the cot provide a foot rest for the infant and also a guard for preventing the shoes of the infant from soiling or scuffing the upholstering material of the vehicle seat. Another more specific object of the invention is to provide an infant carried which may be employed either as a chair or a cot and in which the arrangement and construction of the assembly is such that when the same is employed as a cot elements of the chair or seat may be readily employed as a sunshade extending over a substantial portion of the cot.

Yet another object of the invention is the provision of a simplified and improved construction for an infant chair and/or cot for attachment to a motor vehicle passenger seat, the improvement being distinguished by the construction of the supporting frame or frames employed as well as by the manner in which the frame or frames is maintained in proper horizontal position.

The over and other specific objects and advantages of the invention will become apparent upon consideration of the following detailed specification and the accompanying drawing wherein there is illustrated a preferred embodiment of the invention.

In the drawing:

Figure 1 is a side view of an assembled apparatus constructed in accordance with the principles of the invention, the view showing the apparatus being employed as a cot with the chair or seat in upwardly folded position;

Figure 2 is a side view of the device of Figure 1 but showing the same conditioned for use as a chair or seat; and Figure 3 is an end view of the device of Figure 1 also conditioned for use as a chair or seat.

Referring to the drawing, reference numeral 10 indicates the conventional transverse seat of a motor passenger vehicle and reference numeral 11 designates the back rest or back of this seat. As is shown in Figures 1 and 2 the device of this invention is adapted to be supported entirely by the aforementioned parts of the vehicle and for this purpose the device comprises a rigid rectangular frame 12 adapted to lie against the front surface of the back rest 11. To the upper end of frame 12 is secured a hook-like bail 13 which is arranged to hook over the top of the back 11 as shown in Figures 1 and 2.

Pivotally connected to the side rails of the frame 12 at the points 14 is a seat frame 15 having side rails and an outer end rail. A piece of canvas or other suitable cloth 16 is cut out to proper shape to form the seat of the assembly and, as shown, has certain of its edges draped over the top rail and the upper portions of the side rail of the frame 12 and over certain portions of the frame 15. Suitable means, such as tacks and staples, not shown, is employed to secure the cloth 16 to its supporting frames and the cloth piece is also provided with suitable apertures to form opening 17 for the infant's legs when the parts are assembled and positioned for use. To maintain the seat frame 15 in proper horizontal position when the assembly is installed in a vehicle I provide a length of rope 18 which passes through apertures formed in the frames 12 and 15 and the ends of which are knotted at 19 on the under side of the frame 15. I also provide a belt or strap 20 extending outwardly from the sides of the frame 12 immediately above the pivot points 14 which may be employed, if desired, to tie the infant in the seat for safety reasons.

Also pivotally connected to the side rails of frame 12 but at points 21 spaced below the points 14 is another frame 22 of considerably greater length than the seat frame 15. Frame 22 has an end rail and side rails formed of two sections which are connected on their under sides by the hinges 23 and, as shown in Figure 1, to the frame 22 there is secured a piece of canvas or other suitable cloth 24 which forms an infant's cot or crib as will be understood. To maintain the frame 22 in proper horizontal position when the assembly is installed in a vehicle I provide a length of rope 25 which passes through apertures formed in the frames 12 and 22 and the ends of which are knotted at 26 on the under side of the frame 22. On the upper side of the frame 22 and adjacent either one or both of the apertures therethrough for the accommodation of the rope 25 is a plurality of longitudinally spaced hooks 27 through which the reach or reaches of the rope 25 extending between said apertures and the frame 12 may be selectively looped thus providing means to readily adjust the effective lengths of such reaches as will be understood. In this manner there is provided ready manipulatable means to adjust the horizontal position of the frame 22 since it should be apparent that if the reach is looped through the outermost hook 27 the frame will be raised as shown in dotted lines in Figure 1 whereas if the reach of rope 25 is moved to the innermost hook 27 the outer end of the frame 22 will be lowered.

In use, the device of the invention may be applied to a vehicle seat in the manner indicated in Figures 1 and 2 and if the device is to be utilized primarily as a cot or crib, as shown in Figure 1, the seat frame 15 may be either tilted upwardly as shown in full lines in Figure 1 or left in a horizontal position as shown in dotted lines. When the device is so set up the strip 20 may be employed, in an obvious manner, to stretch the lower portion of the cloth 16 across the frame 15 as suggested at 28 thereby providing an effective sun shield over the head of an infant lying in the cot 24. It should be observed that regardless of whether or not the cloth of the seat is so stretched over the frame 15 the frame may be readily raised and lowered as desired.

Referring to Figure 2, it will be observed that when the device is employed primarily as a seat the frame 22 and cloth 24 of the cot is preferably folded under, the folded end of the frame as well as the bulk of the cloth 24 resting on the vehicle seat cushion 10. This arrangement provides a raised support for the feet of the infant being carried in the seat thus making use of the seat much more comfortable and simultaneously providing a guard over the upholstering fabric of the vehicle seat to prevent soiling and scuffing thereof by the feet of the infant.

The various frames of the above described assembly are preferably constructed of pieces of wood mortised and tenoned together as indicated in the drawing and the pivotal connections 14 and 21 may be made by rivets, screws, or other suitable expedients.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. A convertible infant carrier especially adaptable for use in a motor passenger vehicle and operative to support an infant in either a sitting or a reclining position comprising in combination a support adapted to rest against the back of a seat of said vehicle, means to retain said support in such position, a frame pivotally connected to said support and supporting a piece of downwardly looped cloth having openings therethrough to form a seat for the infant, means to retain said frame in generally horizontal position, a second frame pivotally connected to said support at a point below said first mentioned pivotal connection and supporting the side edges of a second piece of downwardly looped cloth to form an infant's cot, and means to retain said second frame in generally horizontal position.

2. A device according to claim 1 further characterized in that each of the side rails of said second frame is formed of two sections pivotally connected by a hinge whereby said cot may be folded so that the cloth thereof is doubled to provide a foot rest for the infant and a guard over the upholstery of the vehicle seat.

3. In a convertible infant carrier especially adaptable for use in a motor passenger vehicle and operative to support an infant in either a sitting or a reclining position, the combination of a frame having spaced side rails adapted to rest against the back of a seat of said vehicle, a hook secured to the upper end of said frame and adapted to hook over the upper end of said back, a second frame pivotally connected to the side rails of said first mentioned frame and supporting a piece of cloth to form an infant's chair or seat, and a third frame pivotally connected to the side rails of said first mentioned frame at a point below said first mentioned pivotal connection and supporting the side edges of a second piece of cloth to form an infant's cot or crib, the arrangement being such that said second piece of cloth provides a foot rest for an infant seated in said chair or seat and a guard over the upholstery of the vehicle seat, each of the side rails of said third frame being formed of two sections pivotally connected by a hinge positioned on its under sides.

ELMER T. ALLEN.